March 18, 1958 W. V. JORDAN 2,827,260
SLIDE GATE VALVES
Filed July 7, 1955
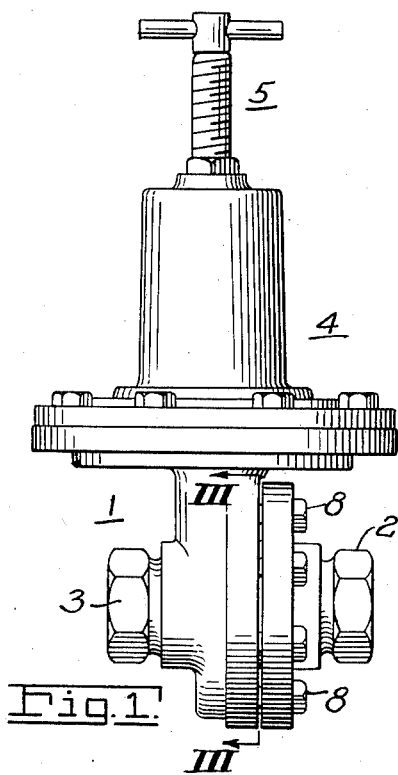
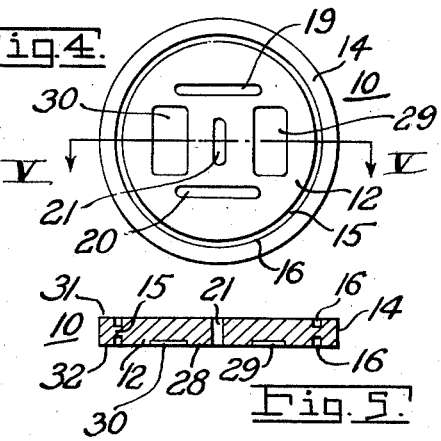
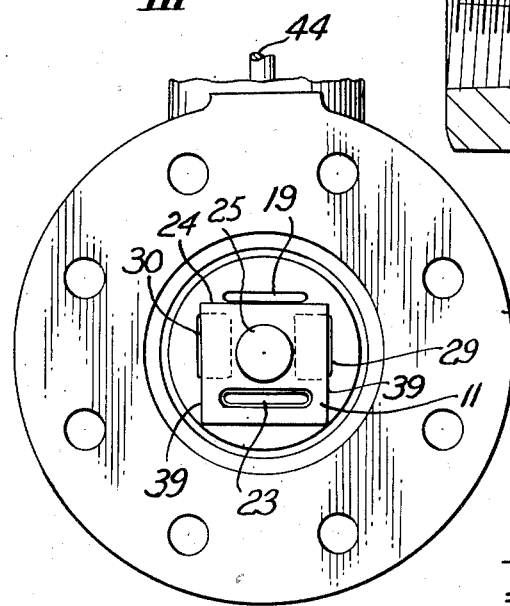
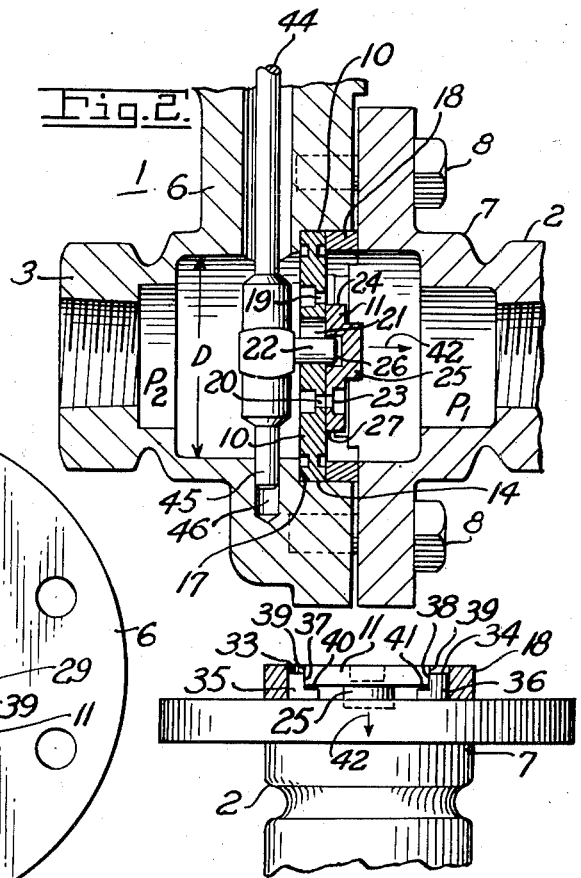
INVENTOR.
WILLIAM VIRGIL JORDAN
BY Zugelter & Zugelter
Attys.

United States Patent Office 2,827,260
Patented Mar. 18, 1958

2,827,260

SLIDE GATE VALVES

William Virgil Jordan, Lebanon, Ohio, assignor to Carl W. Koehler, Cincinnati, and Henry P. Koehler, Findlay, Ohio Application July 7, 1955, Serial No. 520,525

6 Claims. (Cl. 251—326)

This invention relates to slide gate valves and more particularly to slide gates and orifice plates therefor.

An object of this invention is to provide a slide gate valve characterized by ease and smoothness of operation and the ability to provide tight shut-off or dead-end service.

Another object of this invention is to provide a slide gate valve in which the sliding gate is held in fluid tight relation to the orifice plate by fluid pressure of the fluid controlled.

A further object of this invention is to provide a slide gate valve of the above character wherein the slide gate will start moving smoothly and without sticking in response to application of a small force of magnitude equal to or greater than a predetermined value, even when the pressure differential through the valve is high.

A further object of this invention is to provide a slide gate valve of the above character which operates non-erratically in response to applied gate moving forces greater than a predetermined value when the pressure differential through the valve is high.

Another object of this invention is to provide in a slide gate valve an orifice plate and a slide gate adapted to engage the upstream face of the orifice plate, the orifice plate having a thick peripheral rim portion, a thick rigid central portion spaced from the rim portion and having spaced ports, and a flexible annular web integrally joining the rim and central portions and closing the space therebetween, the rigid central portion having a smooth, flat, highly polished upstream face adapted to be engaged by the slide gate, the central portion of the orifice plate covered by the slide gate having recessed areas between and spaced from the ports and extending outwardly of the edges of the slide gate whereby the net effective area of the slide gate exposed to upstream pressure is reduced to a value below the total area of the smooth flat polished orifice engaging face of the slide gate.

A further object of this invention is to provide a slide gate valve of the above character in which means are provided for guiding the gate member in its travel and retaining it within operative distance from the upstream face of the orifice plate when unseated therefrom.

This application is a continuation-in-part of my co-pending application for "Slide Gate Valve," Serial No. 241,935 filed August 15, 1951, and now abandoned.

Other objects and features of the invention will be apparent to those having ordinary skill in the art to which this invention pertains from the following description taken in conjunction with the accompanying drawing, in which:

Figure 1 is a view in side elevation of an assembly comprising a slide gate valve embodying a form of this invention and having pressure responsive control means for actuating same;

Fig. 2 is a view in vertical section of the valve portion of the assembly illustrated in Fig. 1;

Fig. 3 is an end view in elevation of the valve shown in Fig. 2, from which the cover member, shown on the right hand side in Fig. 2, has been removed, the view being taken along the line III—III in Fig. 1;

Fig. 4 is a plan view of an orifice plate having recessed areas in the gate-contacting face thereof;

Fig. 5 is a view in section taken along a line V—V of the orifice plate illustrated in Fig. 4; and Fig. 6 is a view in elevation of the cover member with the slide gate and a portion of the spacing ring in assembled relation thereto, showing the gate-guiding bosses which project from the cover member.

In Fig. 1 of the drawings a gate valve 1 embodying a form of the invention is shown. It is provided with an inlet fitting 2 and an outlet fitting 3. The valve may be of the diaphragm-operated type. When of the diaphragm-operated type, the valve may be provided with a diaphragm-operated mechanism 4 provided with an adjustment screw 5 by means of which the preloading on the diaphragm may be adjusted according to operating requirements.

As shown in Figs. 2 and 3, the valve 1 comprises a body 6 having the outlet fitting 3 and a cover 7 which includes the inlet fitting 2. The cover, as shown, is bolted to the body by means of bolts 6.

The valve illustrated is of the orifice plate sliding gate type and as such is provided with an orifice plate 10 and a slide gate 11. The orifice plate is shown more particularly in Figs. 4 and 5. The plate comprises a relatively rigid central portion 12, the diameter of which is slightly smaller than the diameter D of the valve body bore, and an annular rigid rim 14 whose inner diameter is greater than the diameter of the central portion 12. The rim 14 is integrally joined to the central portion 12 by a relatively flexible web 15. The web preferably joins the rim and the central portion at the middle thereof so that grooves 16 of substantially equal depth are formed in the opposite faces of the plate between the inner diameter of the rim and the perimeter of the central portion 12. The rim of the orifice plate 10 is received in an annular seat 17 formed in the inlet side of the body 6. The plate 10 is clamped in place by means of an annular ring 18 which abuts the outer face of the rim 14, and the cover 7.

The orifice plate 10 is provided with ports 19 and 20. These ports are spaced vertically. That is, they are spaced in the direction in which the slide gate travels between the open and closed positions. In the form of orifice plate illustrated, the ports 19 and 20 are substantially of slot form being relatively long and narrow and substantially rectangular in shape. The center of the central portion 12 is provided with an elongated vertically extending slot 21 to accommodate a pin 22 of the operating mechanism of the valve as will be described infra.

The slide gate 11 is substantially square in outline and is provided near its lower edge with a port 23 of substantially the same shape and size as port 20 in the orifice plate. The central portion of the slide gate 11 is provided with a rearwardly projecting boss 25 in which a recess 26 is formed. The recess 26 lines up and communicates with the pin slot 21.

The opposite faces of the orifice plate are made parallel. The faces 31 and 32 of the rim and face 28 of central portion 12 are made extremely smooth and flat and preferably highly polished. The face of the slide gate 11 that engages the upstream face of the orifice plate is also made very smooth, flat and highly polished, and if the slide gate 11 and orifice plate 10 are urged together as they are slid into face-to-face relation with their co-operating surfaces engaged, as shown in Fig. 2, like gauge blocks, the slide gate 11 is held against the orifice plate 10 and only moves freely in directions parallel to the co-operating surfaces.

In order to reduce the amount of the force required to move the gate 11 from open to closed position and vice-versa under varying pressure differentials ($P_1-P_2$), the pressure $P_1$ being that on the upstream side of the orifice plate and the pressure $P_2$ being that on the downstream side thereof, the upstream face of the central portion 12 is provided with recesses 29 and 30. As shown in Fig. 2, these recesses are on opposite sides of the vertical center line of the gate valve 11 and between the ports 19 and 20. As can be seen in Fig. 2, the outer edges of the recesses 29 and 30 extend outwardly from the sides of the slide gate 11. By providing these recesses, the pressure on the upstream side of the gate valve will act in the recesses as well as on the upstream face of the slide gate 11, thereby reducing the total force of the pressure acting on member 11. Since the total force is reduced, the force required to overcome static friction between member 11 and the upstream face of the central portion 12 is reduced; not only is the static friction reduced, but it is made quite constant over a wide range of pressure differentials ($P_1-P_2$).

The following table shows the difference between the operating force expressed as pressure differential required to move slide valve 11 from open to closed position for the cases where the recesses 29 and 30 are employed and where they are not.

| | | | Differences between maximum and minimum values of $P_2$ corresponding to tight closed and full open positions of gate where plate— | |
|---|---|---|---|---|
| $P_1$ | $P_2$ | ($P_1-P_2$) | has recesses | lacks recesses |
| 80 | 10 | 70 | 1 | 2½ |
| 80 | 30 | 50 | 2 | 5 |
| 80 | 50 | 30 | 2½ | 3½ |
| 100 | 10 | 90 | 1½ | 3 |
| 100 | 30 | 70 | 3 | 5 |
| 100 | 50 | 50 | 3 | 4 |
| 120 | 10 | 110 | 1½ | 3½ |
| 120 | 30 | 90 | 3½ | 6 |
| 120 | 50 | 70 | 4 | 5 |
| 140 | 10 | 130 | 2 | 3½ |
| 140 | 30 | 110 | 4 | 7 |
| 140 | 50 | 90 | 5 | 6 |
| 160 | 10 | 150 | 2½ | 5 |
| 160 | 30 | 130 | 5 | 9 |
| 160 | 50 | 110 | 6 | 8 |

Since pressure regulating valve 1 in its normal use controls pressure on the downstream side of the orifice plate, it is conceivable that the pressure $P_2$ may, under some circumstances, exceed the pressure $P_1$, or come so close to the value of pressure $P_1$ that the gate 11 would be disengaged from the upstream face of the central portion 12. Means are provided to guard against the gate 11 being displaced so far from the upstream face of the central portion 12 as to render the valve inoperative, and also to guide the slide gate 11 in its motion to and from open and closed positions. In the gate valve 1, cover 7 is provided on its inner face with bosses 33 and 34. The outer edges 35 and 36 of these bosses are arcuate so that they will telescope into the ring 18. L-shaped vertical notches in the outer ends of the bosses 33 and 34 have faces 37 and 38 which co-act with the opposite vertical edge faces 39 of the slide gate 11 and guide it in its vertical motion. The ledge faces 40 and 41 of the L-shaped vertical notches extend at right angles to the vertical faces 37 and 38 and serve to retain the slide gate 11 against undue travel rearwardly in the direction of arrow 42.

In the illustrated embodiment of the invention, the slide gate 11 is operated by the diaphragm operator 4. The diaphragm operator 4 is provided with a rod or stem 44 that extends downwardly into the interior of the body of the valve and is provided at its lower end with a guide portion 45 that operates in a socket 46 to retain the stem in vertical alignment. The pin 22 referred to supra, projects rearwardly from the stem through the slot 24 into the recess 26. Thus, as the stem 44 moves upwardly, the slide gate 11 is carried with it. When the slide gate 11 has been moved to its uppermost position, the upper edge 24 of the gate 11 will be above the port 19 and the space between the port 23 in the slide gate and its lower edge 27 will overlap and close the port 20. The recess 26 may be slightly larger than pin 22 to prevent cocking or distortion of the slide gate 11 incident to movement thereof.

Since, as indicated by the foregoing description, it is quite essential that the flat surfaces of the central portion 12 and of the slide gate 11, must remain flat and undistorted, the web 15 which connects the central portion 12 to the rim 16 should be sufficiently flexible so that when the orifice plate is seated in the valve body and clamped in position, distortions which set up strains in the rim 16 are not transmitted to the central portion 12. By making the web 15 sufficiently flexible, the strains tending to distort the entire orifice plate are taken up in the web without distorting the flatness of the contacting surfaces of the gate and central portion 12. Thus the flat co-operating surfaces of the orifice plate and the slide gate 11 will remain flat and fluid-pressure-tight.

Having thus described the invention, it will be apparent to those of ordinary skill in the art to which the invention pertains, that various modifications and changes may be made in the illustrated embodiment without departing from either the spirit or the scope thereof. Therefore, what is claimed as new and desired to be secured by Letters Patent is:

1. In a gate valve, the improvement that comprises an orifice plate and slide gate adapted to engage the upstream face of the orifice plate, the orifice plate having a rigid central portion having spaced ports, a rigid annular rim and a relatively thin flexible web integrally connecting the central portion and the rim, the rim being adapted to be seated in an annular seat in the body of the valve and clamped in position therein, the surface of the upstream face of the orifice plate being smooth, flat and highly polished, the face of the slide gate engaging the upstream face of the central portion of the orifice plate being smooth, flat and highly polished, the flatness and polish of said engaging faces being such that the slide gate, after reciprocation while urged into firm face-to-face engagement with the orifice plate, only moves freely in directions parallel to the co-operating face of the orifice plate, the central portion of the orifice plate covered by the slide gate having recessed areas between and spaced from the ports and located on opposite sides of a median line through the slide gate and extending substantially normal to the ports in the orifice plate, said recessed areas extending outwardly of the edges of the slide gate, whereby the net area of the slide gate exposed to upstream pressure is reduced to a value below the total area of the polished, smooth face of the gate.

2. In a gate valve having a body provided at its upstream side with an annular seat and a cover plate provided with an inlet fitting, the body having a housing provided with means for opening and closing the valve, the improvement that comprises an orifice plate having a rigid central portion whose diameter is substantially equal to the diameter of the flow passage in the valve body, a rigid annular rim having an inside diameter greater than the diameter of the central portion, the inner face of said rim being connected to the periphery of said central portion by a solid web that is integral with the rim and the central portion, the rim being adapted to be seated in the annular seat of the valve body and clamped therein by said cover, the upstream face of the orifice plate having spaced elongated ports, a slide gate disposed to engage the upstream face of the orifice plate and being movable in the direction of spacing of the orifice plate ports, said slide gate having an orifice therein adapted to register with one of the ports of the central portion of the orifice plate when the gate is in open position, the area of the slide gate being such as to close the ports in the orifice plate when the slide gate is in closed position, the slide gate having a travel such that one port in the orifice plate is exposed and the other port is in registry with the port in the slide gate when the gate is in open position, the surface of the orifice plate engaged by the slide gate being provided with spaced recesses located between the ports and extending outwardly of the edges of the slide gate which are parallel to the direction of motion of the slide gate so that a predetermined area on the face of the slide gate that engages the central portion of the orifice plate is exposed to the inlet pressure of the valve, the engaging faces of the orifice plate and the slide gate being flat, polished and of such smoothness that the slide gate, after reciprocation while urged into firm face-to-face engagement with the orifice plate, only moves freely in directions parallel to the co-operating face of the orifice plate, the orifice plate having an opening located between the ports therein and the slide gate having a recess communicating with said opening, and a pin connecting the valve operating mechanism with said slide gate, the pin extending through the opening in the orifice plate and into the recess in the slide gate.

3. An orifice plate for a slide gate valve, said plate comprising a rigid central portion having a pair of opposite axial faces, one of said faces being a smooth flat gate-engaging face, an outer peripheral annular rim spaced from said central portion and having a pair of oppositely facing axial faces, and a flexible web intermediate said pairs of faces and connecting said rim portion and said rigid portion and being thinner than either said rim or said central portion and of a radial extent less than the radial extent of said central portion and closing the space between said rim and said central portion, said central portion having at least one fluid port therethrough, said flexible web being sufficiently thin to prevent transmission of stresses and strains applied to said rim to said central portion and at least one undercut area spaced from said port and positioned for partial bridging by the slide gate whereby said undercut area remains in communication at all times with the fluid chamber in which the slide gate is disposed.

4. In a gate valve, the improvement that comprises an orifice plate and a slide gate adapted to engage the upstream face of the orifice plate, the orifice plate having a rigid central portion having at least one port, a rigid annular rim, and a relatively thin flexible web integrally connecting the central portion and the rim, the rim being adapted to be seated in an annular seat in the body of the valve and clamped in position therein, the surface of the upstream face of the orifice plate being smooth, flat and highly polished, the face of the slide gate engaging the upstream face of the central portion of the orifice plate being smooth, flat and highly polished, the flatness and polish of said engaging faces being such that the slide gate after reciprocation while urged into firm face-to-face engagement with the orifice plate only moves freely in directions parallel to the co-operating face of the orifice plate, the central portion of the orifice plate covered by the slide gate having recessed areas spaced from the port and located on opposite sides of a median line through the slide gate and extending substantially normal to the port in the orifice plate, said recessed areas extending outwardly of the edges of the slide gate, whereby the net area of the slide gate exposed to upstream pressure is reduced to a total value below the total area of the polished, smooth face of the gate.

5. A slide gate valve which comprises a hollow body, an orifice plate mounted in said body and forming therewith a chamber, said orifice plate having a fluid flow passage therethrough, a slide gate in the chamber reciprocable across the orifice plate, said slide gate having a flat face engageable with a first land area on the orifice plate surrounding the orifice and with a portion of a second land area spaced from said first land area, the orifice plate having a depressed face portion intermediate said gate engaged land areas and a portion of said depressed face portion facing but spaced from the gate which is in partially covering relation thereto, said depressed face portion being exposed to chamber pressure at all times, and means for moving the gate across the orifice plate.

6. In a gate valve having a body provided at its upstream side with an annular seat and a cover plate provided with an inlet fitting, the body having a housing provided with means for opening and closing the valve, the improvement that comprises an orifice plate having a rigid central portion whose diameter is substantially equal to the diameter of the flow passage in the valve body, a rigid annular rim having an inside diameter greater than the diameter of the central portion, the inner face of said rim being connected to the periphery of said central portion by a solid web that is integral with the rim and the central portion, the rim being adapted to be seated in the annular seat of the valve body and clamped therein by said cover, the upstream face of the orifice plate having spaced elongated ports, a slide gate disposed to engage the upstream face of the orifice plate and being movable in the direction of spacing of the orifice plate ports, means being provided for guiding the slide gate in its travel between open and closed positions and retaining it within operative distance from the upstream face of the orifice plate when disengaged therefrom in response to the pressure on the downstream side of the orifice plate exceeding the pressure on the upstream side thereof, said slide gate having an orifice therein adapted to register with one of the ports of the central portion of orifice plate when the gate is in open position, the area of the slide gate being such as to close the ports in the orifice plate when the slide gate is in closed position, the slide gate having a travel such that one port in the orifice plate is exposed and the other port is in registry with the port in the slide gate when the gate is in open position, the surface of the orifice plate engaged by the slide gate being provided with spaced recesses located between the ports and extending outwardly of the edges of the slide gate which are parallel to the direction of motion of the slide gate so that a predetermined area on the face of the slide gate that engages the central portion of the orifice plate is exposed to the inlet pressure of the valve, the engaging faces of the orifice plate and the slide gate being flat, polished and of such smoothness that the slide gate, after reciprocation while urged into firm face-to-face engagement with the orifice plate, only moves freely in directions parallel to the co-operating face of the orifice plate, the orifice plate having an opening located between the ports therein and the slide gate having a recess communicating with said opening, and a pin connecting the valve operating mechanism with said slide gate, the pin extending through the opening in the orifice plate and into the recess in the slide gate.

References Cited in the file of this patent

UNITED STATES PATENTS

| Number | Name | Date |
| --- | --- | --- |
| 929,238 | McGillivray | July 27, 1909 |
| 1,448,291 | Gorbutt | Mar. 13, 1923 |
| 1,449,478 | Wilson | Mar. 27, 1923 |
| 2,229,932 | Parker | Jan. 28, 1941 |
| 2,640,498 | Bissell | June 2, 1953 |

FOREIGN PATENTS

| 726,121 | Great Britain | Mar. 16, 1955 |